(12) United States Patent
Nishikawa

(10) Patent No.: US 6,972,732 B1
(45) Date of Patent: Dec. 6, 2005

(54) INFORMATION DISPLAY SYSTEM

(75) Inventor: Eiji Nishikawa, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 748 days.

(21) Appl. No.: 09/588,020

(22) Filed: Jun. 6, 2000

(30) Foreign Application Priority Data

Aug. 27, 1999 (JP) ................................. 11-241829

(51) Int. Cl.⁷ ............................................. G09G 5/00
(52) U.S. Cl. ........................ 345/1.1; 345/2.3; 345/97; 455/566
(58) Field of Search ..................... 345/169, 97, 104, 345/107, 108, 109, 172, 473, 1.1, 2.1, 2.3, 345/1.3, 2.2, 5, 31, 901, 902; 361/686; 455/557, 455/566; 348/734

(56) References Cited

U.S. PATENT DOCUMENTS

| | | | | |
|---|---|---|---|---|
| 4,760,388 A | * | 7/1988 | Tatsumi et al. ............... | 345/1.3 |
| 5,277,784 A | * | 1/1994 | Woo ........................... | 205/109 |
| 5,583,539 A | * | 12/1996 | Hiketa et al. ................ | 345/823 |
| 5,638,245 A | * | 6/1997 | Kim ............................ | 361/86 |
| 5,729,366 A | * | 3/1998 | Yang ........................... | 359/13 |
| 5,774,105 A | * | 6/1998 | Yamamoto et al. ........... | 345/97 |
| 6,104,507 A | * | 8/2000 | Nakanishi et al. ........... | 368/468 |
| 6,107,981 A | * | 8/2000 | Fujita .......................... | 345/95 |
| 6,208,354 B1 | * | 3/2001 | Porter ......................... | 345/634 |
| 6,262,705 B1 | * | 7/2001 | Inoue et al. ................. | 345/100 |
| 6,265,986 B1 | * | 7/2001 | Oka et al. .............. | 340/815.52 |
| 6,304,431 B1 | * | 10/2001 | Kim ............................ | 361/680 |
| 6,400,340 B1 | * | 6/2002 | Nishida ....................... | 345/1.1 |
| 6,411,282 B1 | * | 6/2002 | Ishizawa et al. ............ | 345/169 |
| 6,445,385 B1 | * | 9/2002 | Shin et al. ................... | 345/204 |

* cited by examiner

Primary Examiner—Alexander Eisen
Assistant Examiner—Abbas Abdulselam
(74) Attorney, Agent, or Firm—Oliff & Berridge, PLC

(57) ABSTRACT

An information display system in which information can be referred to without a power supply anytime and anywhere like information recorded on paper, and in which information can be rewritten repeatedly, and such information can be outputted instantaneously and in large numbers. An image accepted by an image input unit (1 in FIG. 1) is converted by a signal processing unit (11) into a data format for writing the image into a display unit (3). An information sending unit (12) controls plural display elements (3-1 to 3-N), and it sends the information to-be-displayed to the plural display elements (3-1 to 3-N) in parallel through a connector array (13). Thus, the image accepted by the image input unit (1) can be instantaneously displayed on the multiple display elements (3-1 to 3-N). The display elements (3-1 to 3-M) have storability. Therefore, even when the display elements (3-1 to 3-N) have been detached from the connector array (13), the displayed images are kept as they are, and they can be referred to anytime and anywhere.

14 Claims, 6 Drawing Sheets

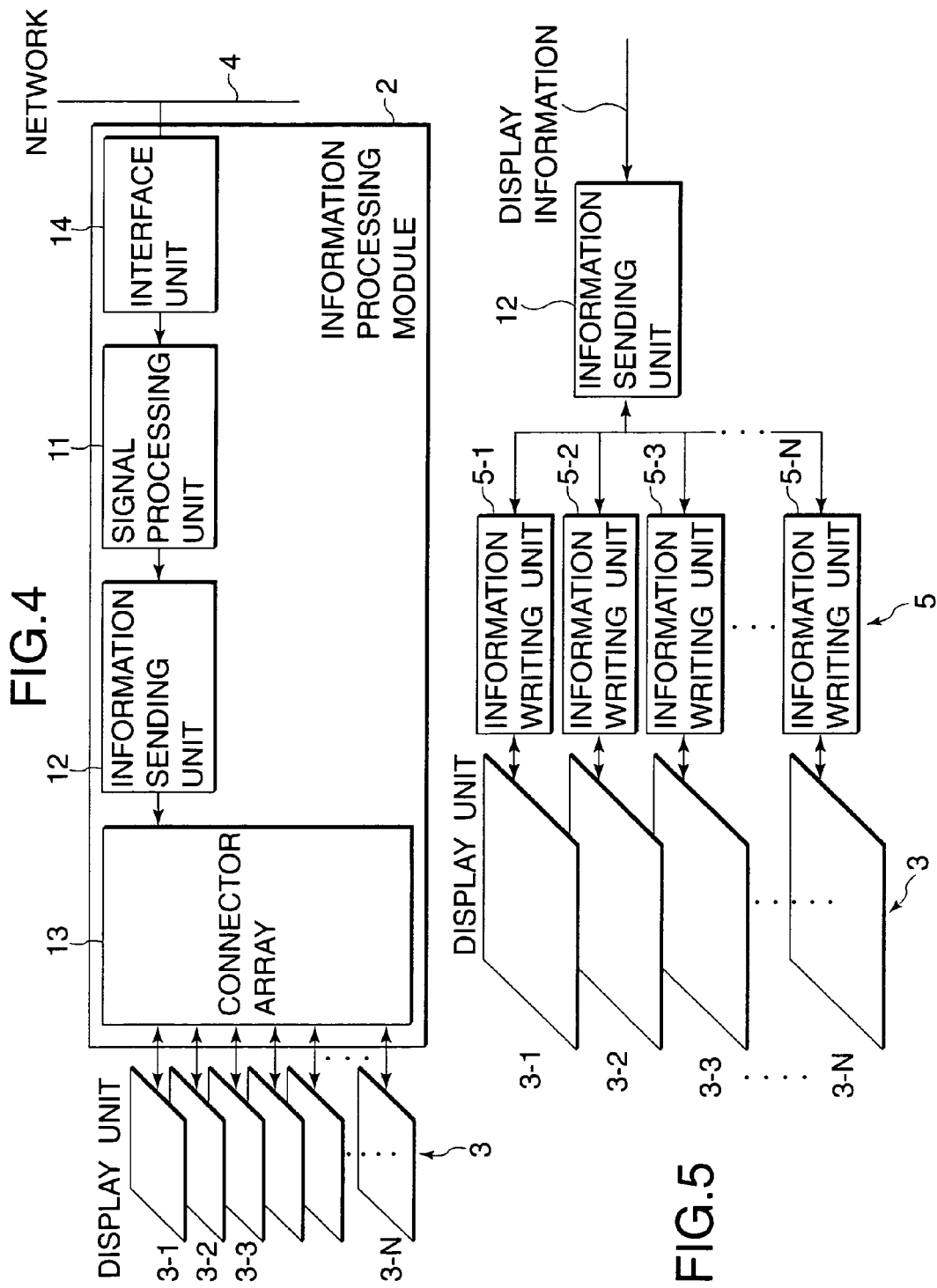

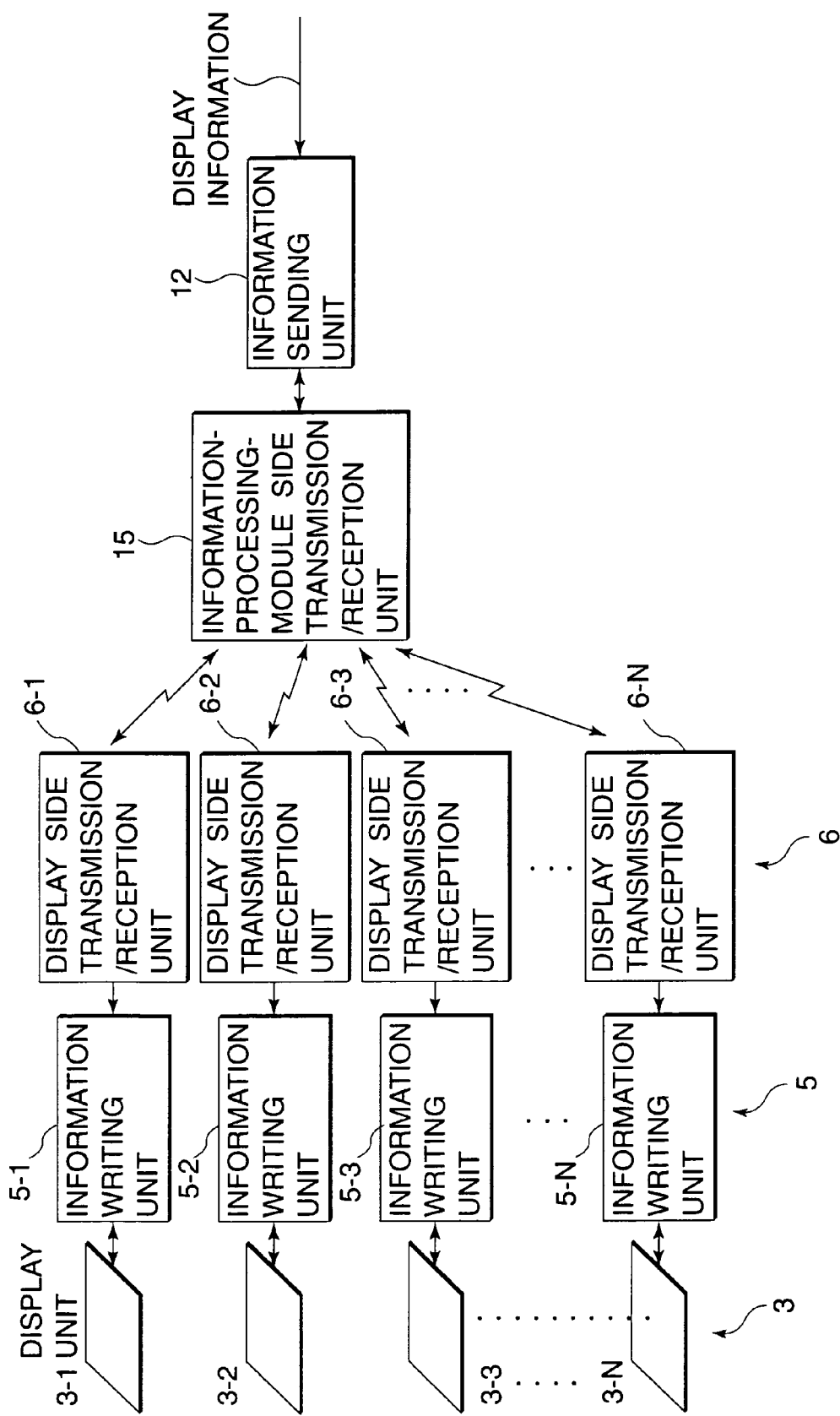

INFORMATION DISPLAY SYSTEM

BACKGROUND OF THE INVENTION

1. Field of the Invention

The present invention relates to an information display system which is capable of displaying information on plural display elements having storability.

2. Description of the Related Art

As output devices generally employed at present, there are recording devices, for example, OA equipment such as a copier and a printer, which record and output information on paper or the like. A display device, such as liquid crystal device or CRT device, which displays an image and data in a personal computer or the like, is also one of the output devices.

With the recording device, the information in recorded on the paper or the like medium. Since the information recorded on the paper or the like are held as it is even after the recording, the recording device brings forth the advantage that the recorded information can be referred to anytime. In addition, the paper or the like in easy of handling, and the respective sheets of paper can be widely distributed. However, some time period is required for recording the information on one sheet of paper. Besides, since the recording is usually done every sheet, the recording device involves the problem that, when the number of sheets of the paper for the recording is large, a very long time is required. By way of example, in a case where the same information is recorded on multiple sheets, which are then distributed widely, a long time is expended on the recording output. It is also considered that the number of recording devices is enlarged to increase the number of sheets which can be recorded and outputted at the same time, but this measure necessitates a large area of installation. Further, since the information cannot be rewritten with the medium such as paper, the recording device involves the problem that, when the information has become unnecessary, the medium turns into trash, leading to environmental disruption.

On the other hand, with the display device such as the liquid crystal device (for example, a TN liquid crystal display device using TFTs) or the CRT device, the information can be displayed and outputted instantaneously and can be rewritten repeatedly. However, when the power supply of the display device is turned OFF, the displayed information is erased. It in therefore impossible to widely distribute the same information as in the above example. In addition, the displayed information cannot be referred to anytime and anywhere unlike the information recorded on the paper or the like. Even if plural display devices are arrayed so as to display and output the same information, a large area is necessitated for the installation thereof. Besides, in order to keep the displayed and outputted information as it is, the display device must be continually connected to the power supply, and this dissipates energy wastefully. Further, the display device in the prior art is not so excellent as the paper or the like in points of portability and easiness of transporting, and it needs to be handled along with, for example, the power supply when it is to be carried or conveyed while keeping the displayed information. Moreover, in referring to the information, the user of each of some display devices need to fix the position of the reference in adaptation to the display device, and the handling of the display device is inconvenient as the medium for referring to the information.

SUMMARY OF THE INVENTION

The present invention has been made in view of the above circumstances and provides an information display system in which information can be referred to without a power supply anytime and anywhere like information recorded on paper, and in which information can be rewritten repeatedly, and such information can be outputted instantaneously and in large numbers.

According to an aspect of the present invention, the information display system has plural display sections having storability, and an information sending section for sending information to-be-displayed to the plural display sections. According to another aspect of the present invention, the information display system has a configuration in which plural information writing sections for writing information into display sections are separately disposed, and information sent from the information sending section is written into the display sections by the information writing sections. Owing to such a configuration the information sent from the information sending section is written into the plural display sections in parallel and in displayed on the respective display sections. The operation of writing the information into each display section suffices with a short time. By way of example. Fin a case where the same information is written into multiple display sections, the operation ends in nearly the same time period as the time period for writing the information into one display section. Even in a case where different information items are written into the multiple display sections, essentially time periods for transferring the information items are merely added, and a time period required till the completion of display does not become considerably longer.

Moreover, since the display section has the storability, a power supply is unnecessary after the writing of the information. Even when the display section has been detached from the information sending section or the information writing section by way of example, the displayed information ie kept as it in. Since the display sections need not include a power supply or the like, it is excellent in portability and easiness in handling, it can be employed as a substitute for paper. Therefore, after the information has been displayed, the displayed information can be referred to anytime and anywhere.

Further advantages are that, since the display section does not require electric power after the writing of the information, it is excellent in energy savings, and that, since the display section is capable of rewriting information repeatedly, it disrupts environment less as compared with the paper.

When such an information display system is additionally provided with, for example, an information reading section, it can be caused to function as a copying device which can instantaneously take a large quantity of copies. Besides, when the system is constructed so as to display external information, it can be caused to function equivalently to a recording device which can instantaneously produce a large quantity of outputs.

BRIEF DESCRIPTION OF THE DRAWINGS

Preferred embodiments of the present invention will be described in detail based on the following figures, wherein:

FIG. 4 is a block diagram showing a second embodiment of the information display system according to the present invention;

FIG. 5 in a block diagram showing a third embodiment of the information display system according to the present invention;

FIG. 6 is a block diagram showing a modification in the third embodiment of the information display system according to the present invention;

PREFERRED EMBODIMENTS OF THE INVENTION

Figure 1:
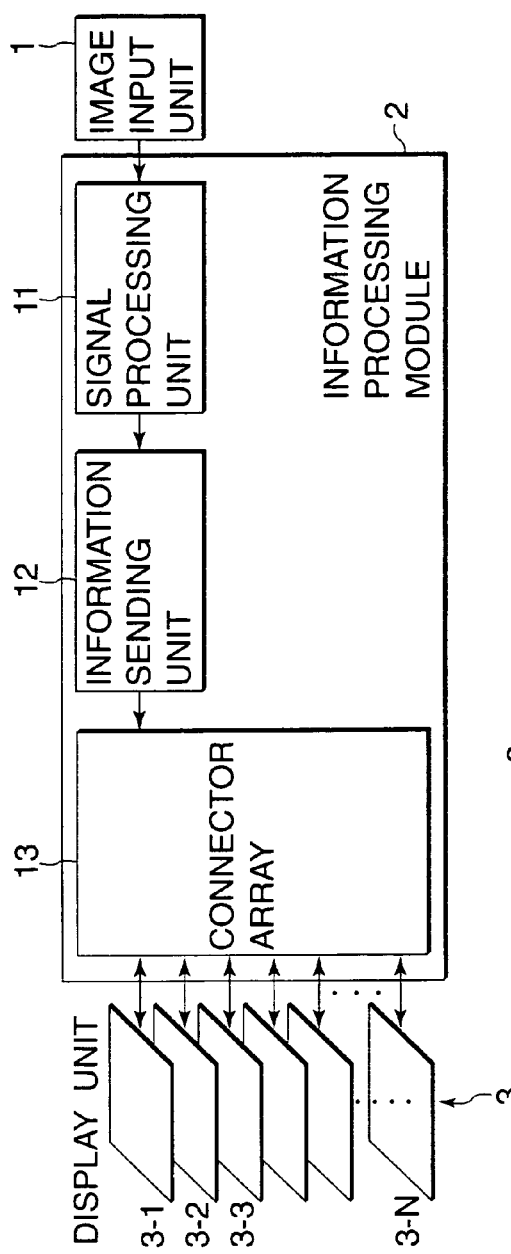
FIG. 1 is a block diagram showing a first embodiment of an information display system according to the present invention.

FIG. 1 is a block diagram showing a first embodiment of an information display system according to the present invention. Referring to the figure, the system has an image input unit 1, an information processing module 2, a display unit 3 (display elements 3-1 to 3-N), a signal processing unit 11, an information sending unit 12, and a connector array 13. The example shown in FIG. 1 illustrates a configuration in the case where the information display system of the present invention in utilized as a copying machine.

The image input unit 1 enters an image-to-be-copied. It can be constructed of, for example, an image scanner or a digital camera. It converts an analog signal from a photo-detector such as CCD image sensor, into a digital signal, which is subjected to, various sorts of image correction processes on the input side of the system. The resulting image signal in sent to the information processing module 2.

The information processing module 2 includes the signal processing unit 11, the information sending unit 12 and the connector array 13 in this example. The signal processing unit 11 executes predetermined processes for the image entered by the image input unit 1, thereby to convert the image into information (such an bit map information) which can be displayed by the display unit 3. The information sending unit 12 controls the plural display elements 3-1 to 3-N connected thereto through the connector array 13, so that the image processed by the signal processing unit 11 may be sent to and displayed on the display elements 3-1 to 3-N. Connectors numbering N, to which the respective display elements 3-1 to 3-N are electrically connected, are arrayed in the connector array 13.

The display unit 3 (display elements 3-1 to 3-N) is a display device having storability. It can be constructed of, for example, a ferroelectric liquid-crystal display device, a cholesteric liquid-crystal display device or an electro-phoretic display device. The individual display elements 3-1 to 3-N are free to be attached to and detached from the connector array 13, respectively. These display elements 3-1 to 3-N do not have any power supply for display by themselves, in writing the image information to-be-displayed, they are fed with electric power through the connector array 13. After the image has been written, they are detached from the connector array 13, and they can keep the display of the image despite the cutoff of the electric power.

Figure 2:
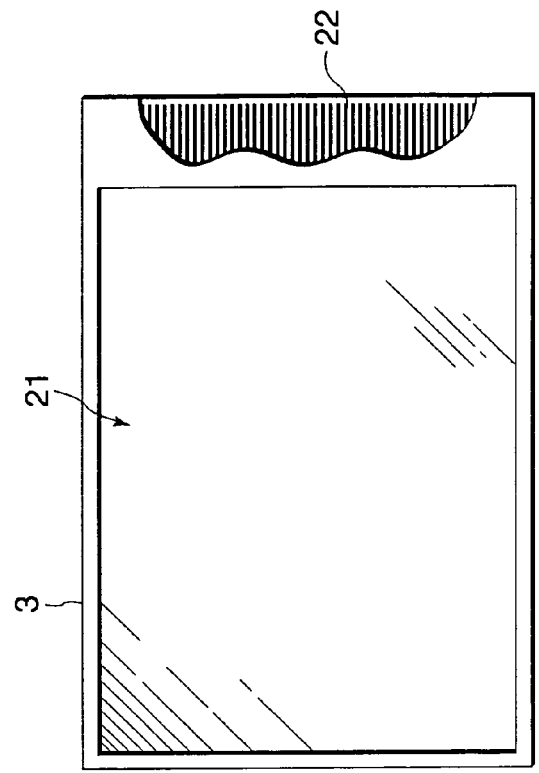
FIG. 2 is a plan view showing an example of a display unit.

FIG. 2 is a plan view showing an example of the display unit 3. Referring to the figure, numeral 21 designates a display area, and numeral 22 a connector portion. By the way, in the illustration of FIG. 2, the case of the display unit 3 is partially broken away so that part of the connector portion 22 can be seen.

As shown in FIG. 2 by way of example, the display unit 3 has a size which is nearly equal to the total of the sizes of the display area 21 and the connector portion 22. As will be explained later, the display unit 3 has almost no circuit element, and it can also be constructed having quite no circuit element. Therefore, it requires no appreciable additional space for any other than the display area 21 and the connector portion 22, and it can be utilized as a medium whose size in substantially equal to the size of the image to-be-displayed. Further, the display unit 3 can be constructed so as to be flexible.

Although a cartridge type connector is employed as the connector portion 22 in this example any known connection method can be optionally selected for the electrical connections of the display unit 3 with the connector array 13. By way of example, the electrical connections can be done by disposing a group of contacts on the back surface or side surface of the display unit 3 and connecting them through a spring-biased pin connector or a probe, such as a probing card, for use in the test of an 1C. In this case, the size of the display unit 3 can be reduced substantially to that of the display area 21.

The operation of the configuration shown in FIG. 1 will be briefly explained. An image accepted by the image input unit 1 is converted by the signal processing unit 11 into a data format (for example, bit map information) which is convenient for writing the image into the display unit 3. Further, the resulting signal is sent from the information sending unit 12 to the plural display elements 3-1 to 3-N in parallel through the connector array 13. On this occasion, the information sending unit 12 also performs the write control of the display elements 3-1 to 3-N so as to write the output image of the signal processing unit 11 into these display elements 3-1 to 3-N. Thus, the image accepted by the image input unit 1 is displayed on the display areas 21 of the respective display elements 3-1 to 3-N.

The operations of writing the image into the display elements 3-1 to 3-N proceed in parallel. Therefore, in case of displaying the same image on the individual display elements, the series of processes can be ended in substantially equal time periods irrespective of the number of the display elements on which the image is to be displayed. As a concrete example, in a case where the same image was displayed on 100 sheets of display elements (N-100), a required time period was about 3 seconds. The required time period is a time period expended in recording on one sheet of paper in, for example, a recording device which performs the recording of 20 sheets of paper every minute. It turned out that the recording of 100 sheets could be done in the time period for recording on one sheet of paper. In this manner, the image can be displayed on the multiple display elements at the very high speed.

Furthermore, by way of example, the thickness of each display element is about 5 mm, and a height of about 50 cm suffices even when the 100 sheets of display elements are stacked. A space required for setting the 100 sheets of display elements is not considerably large, either. Therefore, the information display system of this embodiment can be satisfactorily realized with dimensions which are nearly equal to or less than those of, for example, a copier which is utilized in an ordinary office or the like.

After the image has been written, the display elements 3-1 to 3-N can be detached from the connector array 13 so as to be widely distributed by way of example. Since the display elements 3-1 to 3-N have the storability, the displayed images are kept as they are even when these display elements have been detached from the connector array 13. Therefore, persons to whom the display elements 3-1 to 3-N have been widely distributed by way of example can refer to the displayed images anytime and anywhere.

Moreover, since each of the display elements 3-1 to 3-N includes almost no power supply, circuit elements, etc. as stated above, it is very light in weight and small in size, and it is excellent in point of portability. Besides, since it is flexible, it is easy of handling. Thus, it can be handled likewise to the paper despite the display device. In addition, when an image is written into the display elements 3-1 to 3-N by attaching them to the connector array 13 again, these display elements have their display screens updated with ease, and they can be utilized repeatedly. Therefore, they are the medium which is gentle to environment. Further, since the display elements 3-1 to 3-N require no electric power during the display as stated above, they are advantageous from the viewpoint of energy savings as compared with other display devices.

Incidentally, the N display elements need not always be connected to the connector array 13, but the display elements may be attached to the connector array 13 in accordance with a required number of sheets. Besides, when an image to be displayed is sent to only some of the display elements connected to the connector array 13 by way of example, the image can be displayed on only the desired number of display elements without regard to the number of the attached display elements. A configuration for displaying the image on only some of the display elements in this manner, may be incarnated in such a way that data lines laid to the connector array 13 are ON/OFT-controlled by switching elements or the likes. Alternatively, as will be explained below, the configuration may be incarnated in such a way that setting information items are exchanged between the display elements 3-1 to 3-N and the information sending unit 12, and that only the display elements meeting conditions receive and display the image. A practicable example to be now described corresponds to a case of adopting the latter method.

Figure 3:
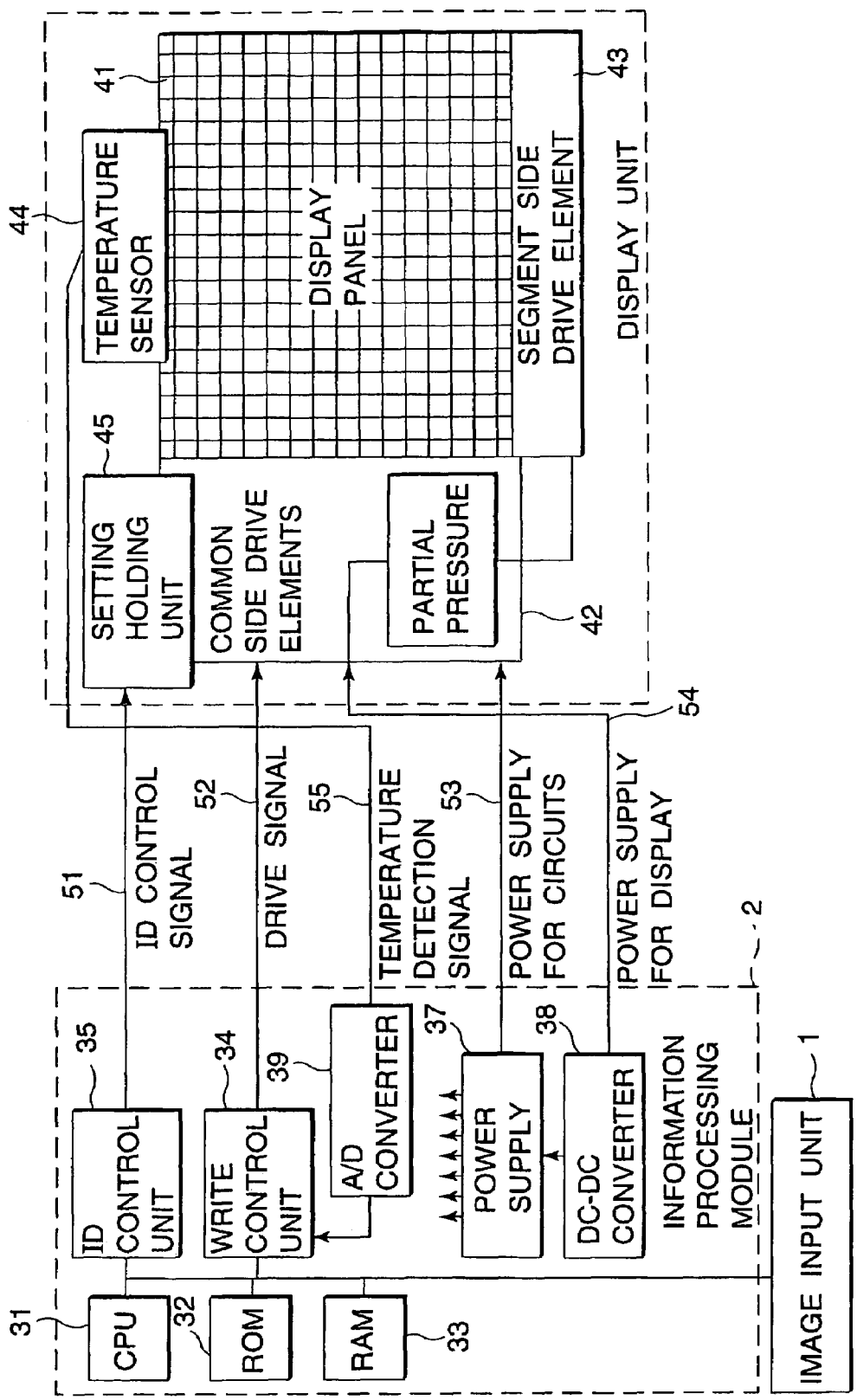
FIG. 3 is a block diagram showing a practicable example in the first embodiment of the information display system according to the present invention.

FIG. 3 is a block diagram showing the practicable example in the first embodiment of the information display system according to the present invention. In the figure, the same reference numerals are assigned to constituents similar to those in FIG. 1. The information processing module 2 of the system includes a CPU 31, an ROM 33, an RAM 33, a write control unit 34, an ID control unit 35, a bus 36, a power supply 37, a DC-DC converter 38, and an A/D converter 39. The display unit 3 of the system includes a display panel 41, common side drive elements 42, segment side drive elements 43, a temperature sensor 44, and a setting holding unit 45. Numeral 51 designates an ID control signal, numeral 52 a drive signal, numeral 53 a power supply for circuits, numeral 54 a power supply for display; and numeral 55 a temperature detection signal. In the example shown in FIG. 3, the information processing module 2 and the display unit 3 are interconnected by the ID control signal 51, the drive signal 52, the power supply for circuits 53, the power supply for display 54, and the temperature detection signal 55. Incidentally, lines for the ID control signal 51 and the temperature detection signal 55 are laid every display element, and lines for the drive signal 52 and for the power supplies can be laid in common for all the display elements.

In this example, the information processing module 2 is so constructed that the CPU 31. RON 32, RAM 33, write control unit 34 and ID control unit 35 are connected to the bus 36. Also, the image input unit 1 of the system is connected to the bus 36. Further, the power supply 37 feeds electric power to various parts, and it feeds the power supply for circuits 53 to the display unit 3 and the power supply for display 54 thereto through the DC-DC converter 38.

The CPU 31 controls the whole information processing module 2 in accordance with, for example, a program stored in the ROE 32, and while using the RAN 33. In particular, it executes the functions of the signal processing unit 11 and information sending unit 12 shown in FIG. 1. The RON 32 stores therein, not only programs according to which the CPU 31 operates, but also data which are fixedly used. The RAN 33 is utilized, not only as the work area of the CPU 31, but also as an image memory for accumulating an image accepted by the image input unit 1, the image after having been processed by the CPU 31, and so forth.

The write control unit 34 sends image information to be displayed on the display unit 3, to this display unit 3 as the drive signal 52. The drive signal 52 contains a frame signal, a display signal, a synchronizing clock, a line cycle clock, an alternating signal, etc. in addition to the image information. Besides, the write control unit 34 receives the temperature detection signal 55 indicating the temperature of the display unit 3, as a digital signal through the A/D converter 39, thereby to monitor the temperature of the display unit 3. Further, it changes drive energy (write pulse width) for the display unit 3 in accordance with the detected temperature, so as to write the image stably.

The ID control unit 35 reads out the setting information held in the setting holding unit 45 of the display unit 3, and it selects the display unit into which the information to-be-displayed in to be written, in accordance with the setting information read out. In order to give commands for reading and writing the setting information, lines for the ID control signal 51 includes the signal lines of a selection signal for the display unit, a write/read switching signal, a clock signal, a data signal, etc.

The display unit 3 is configured of the display panel 41, the common side drive elements 42, the segment wide drive elements 43, the temperature sensor 44, the setting holding unit 45, and so forth. The display panel 41 is such that pixels for actually displaying information are arranged in two dimensions, in case of employing, for example, a ferroelectric liquid-crystal panel, the display panel 41 is so constructed that two base plates formed with parallel electrodes are opposed with the parallel electrodes intersecting orthogonally, and that a ferroelectric liquid crystal is held between the opposed base plates. The intersection points between the parallel electrodes form the individual pixels. The parallel electrodes formed on one of the two base plates are respectively connected to the segment side drive elements 43, while the parallel electrodes formed on the other base plate are respectively connected to the common side drive elements 42. Each of the segment side drive elements 43 and the common side drive elements 42 drives the corresponding one of the parallel electrodes. Thus, information can be written into and displayed on the pixel of the intersection point between the driven electrodes. Incidentally, electric power for driving the display panel 41 fed as the power supply for display 54. Besides, the electric power of the segment side drive elements 43 and the common side drive elements 42 is fed by the power supply for circuits 53, of course, any other display system having storability may well be employed, and a drive system conforming to the display system employed may be adopted.

The temperature sensor 44 is constructed of, for example, a thermistor, and it delivers a voltage value (analog value) corresponding to the temperature of the display panel 41, as the temperature detection signal 55. By the way, it is also possible to employ a configuration which does not have the temperature sensor 44.

The setting holding unit 45 holds information, for example, the ID of the pertinent display element and the size of the display panel 41. The ID may be, for example, a serial No, peculiar to the pertinent display element, or it may well be given by the ID control unit 35 of the information processing module 2. As the size of the display panel 41, the size information of, for example, the paper size of "B5" or "A4"format or the screen size of 13 [inches] or 15 [inches] can be set beforehand. Besides, various information items peculiar to the display element can be set beforehand. Further, various information items concerning, for example, the displayed information can be held beforehand. By way of example, the name of a document, the date and hour of creation, security information and link information can be written into the setting holding unit 45 beforehand. Incidentally, a nonvolatile storage element, for example, an SRAM or an EEPROM, in which set information is not erased despite the cutoff of electric power can be employed as the setting holding unit 45.

Further, the setting holding unit 45 controls the operations of both or either of the comon side drive elements 42 and the segment side drive elements 43 in accordance with a selection signal from the information processing module 2. More specifically, in a case where the signal for selecting the pertinent display unit 3 in inputted by the ID control signal 51, the setting holding unit 45 grants the writing of information into the display panel 41. To the contrary, in a case where the signal for the selection is not inputted, the writing into the display panel 41 is not performed even if the drive signal 52 is entered. Likewise, the setting information is not read out of or written into the setting holding unit 5.

Incidentally, although only one display element 3 is depicted in the example shown in FIG. 3, plural display elements 3 having the same configuration are connected to the information processing module 2.

Examples of operations in the above configuration shown in FIG. 3 will be briefly explained. After the display elements 3 have been connected to the information processing module 2, and before information to be displayed in written, the ID control unit 35 of the information processing module 2 loads setting information from the setting holding unit 45 of each display element 3 through the ID control signal 51. More specifically, the ID control unit 35 sends a signal for reading out the setting information, along with a signal for selecting the display element 3, to the display element 3 an the ID control signal 51. Then, the setting holding unit 45 of the display element 3 sends the setting information to the information processing module 2. Thus, the sizes of the individual connected display elements 3, for example, can be detected by the CPU 31.

When an image has been loaded by the image input unit 1, the CPU 31 subjects the loaded image to predetermined processes. Subsequently, the display element 3 to display the image in selected, and the selection is notified to the selected display element 3 through the ID control signal 51 by the ID control unit 35. Simultaneously, the write control unit 34 sends the image to-be-displayed to the display element 3 through the drive signal 52. In the display element 3, the common side drive elements 42 and the segment side drive elements 43 drive the individual pixels of the display panel 41 in accordance with a control based on the write control unit 34, thereby to write the information. In this way, the information can be written into and displayed on the selected one, of the multiple display elements 3 connected. Of course, plural ones of the display elements 3 may well be selected. In that case, the operations of writing and displaying the image are performed in parallel.

Incidentally, the operation of setting affixed information, for example, the name of the image and the date and hour of creation, in the setting holding unit 45 as the setting information before or after the writing of the image into the display element 3 or concurrently with the writing of the image. More specifically, a signal for writing the setting information is sent to the display element 3 as the ID control signal 51, along with a signal for selecting the display element 3, and the setting information is sent to the display element 3. Thus, the sent setting information is held in the setting holding unit 45 of the display element 3.

FIG. 4 is a block diagram showing a second embodiment of the information display system according to the present invention. In the figure, the same symbols are assigned to constituents similar to those in FIG. 1, and they shall be omitted from description. Numeral 4 designates a network, and numeral 14 an interface unit. The example shown in FIG. 4 illustrates a configuration in the case where the information display system of the present invention is utilized as a recording device.

As information to-be-displayed, the contents of an image file or a document file stored in another computer or the like are sent through the network 4. The information to-be-displayed is received by the interface unit 14, and it can be displayed on plural display elements 3 in the same way as in the first embodiment explained above.

The example shown in FIG. 4 illustrates the architecture in which the information processing module 2 of the information display system is connected with the other computer through the network 4. It is also allowed, however, to adopt an architecture in which a computer is directly connected to the interface unit 14 by way of example. Besides, the computer is connected to the interface unit 14, not only through the network 4 or electric wire such as a connecting cable, but also through, for example, infrared rays represented by IrDa. Also possible is a wireless connection which is done through, for example, "Bluetooth" developed by Ericsson Inc. or a Personal Handy Phone system (PHS) or cellular phone systems. The interface unit 14 may be constructed of an infrared interface or a wireless reception/transmission device conforming to such a system.

FIG. 5 is a block diagram shoving a third embodiment of the information display system according to the present invention. In the figure, the same symbols are assigned to constituents similar to those in FIG. 1, and they shall be omitted from description. Numeral 0 and symbols 5-1 to 5-N denote information writing units. In a configuration illustrated in the third embodiment, the information writing units 5 are respectively disposed in correspondence with display elements 3. The individual display elements 3 are free to be attached to and detached from the information writing units 5, respectively.

The information writing unit 5 controls the corresponding display element 3 so as to write information to-be-displayed sent from an information sending unit 12, into the display element 3 and to display the information thereon. In addition, the information writing unit S can communicate with the information sending unit 12, thereby to notify the information sending unit 12 of, for example, the ID information of the display element 3 and whether or not the display element 3 is set. Besides, upon receiving selection information sent from the information sending unit 12, the information writing unit 5 functions to decide whether or not it is selected, on the basis of the selection information.

By the way, the selection information which is sent from the information sending unit 12 may be either ID information for specifying the information writing unit 0 or information indicating a predetermined condition. In a case where the information indicating the predetermined condition has been sent as the selection information from the information sending unit 12, each information writing unit 5S may check the condition so as to decide whether or not information is to be written into the corresponding display element 3. In this case, whether or not the information is to be written is selected on the side of the information writing unit 5. Besides, in a case where the information mending unit 12 sends the ID information an the selection information, the display unit 3 for displaying the information is specified on the side of the information mending unit 12, and the ID information of the information writing unit 5 corresponding to the specified display unit 3 is transmitted. In this case, the selection of the display element 3 into which the information is to be written is done on the side of the information sending unit 12. Of course, it is also possible to adopt a configuration which does not have such a selecting function.

By way of example, the information writing unit 5 can be constructed so an to also include the common side drive elements 42 and the segment side drive elements 43 in the configuration of the display unit 3 shown in FIG. 3. In this case, the display unit 3 in this embodiment has no drive elements and can be made still smaller in size and lighter in weight. Besides, the information writing unit 5 fulfills the functions of the write control unit 34 disposed in the information processing module 2 shown in FIG. 3. Incidentally, the information writing unit 5 requires an electrical power in writing the information into the display unit 3. However, the display unit 3 detachably attached to the information writing unit 5 does not require any electrical power, and even after it has been removed from the information writing unit 5, displayed information is held as it is by the storability of the display unit 3.

FIG. 6 in a block diagram showing a modification in the third embodiment of the information display system according to the present invention. Referring to the figure, numeral 6 designates a display-unit side transmission/reception unit, and numeral 15 an information-processing-module side transmission/reception unit. The example shown in FIG. 6 corresponds to a case where the information sending unit 12 and the information writing units 5-1 to 5-N are coupled by a wireless connection through, for example, the aforementioned "Bluetooth" or the PHS or cellular phone system, or by the infrared rays represented such as IrDA. Each of the information-processing-module side transmission/reception unit 15 and the display-unit side transmission/reception unit 6 may be constructed of a receiver/sender which conforms to the wireless system or the like employed.

In such a configuration, how large the number of the display elements 3 as well as the information writing units 5 and the display-unit side transmission/reception units 6 may be it is permitted to write-information collectively into the display elements 3 from one information sending unit 12. Besides, when the wireless system is utilized byway of example, the display elements 3 need not exist near the information sending unit 12. Even in a case where the display elements 3 lie scattered, it is possible to collectively write information or alter displayed information. Of course, it is also possible to write information selectively into some of the plural display elements 3, using selection information.

Figure 7:
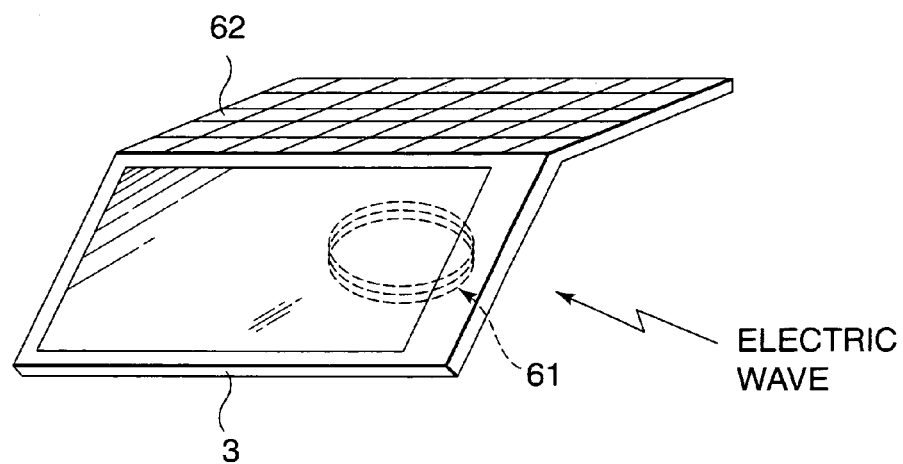
FIG. 7 schematically shows a configuration example of a display unit 3, an information writing unit 5 and a display-unit side transmission/reception unit 6 in a modification to the third embodiment of the information display system according to the present invention.

FIG. 7 is a sketch showing examples of the configurations of the display unit 3 an well as the information writing unit 5 and the display-unit side transmission/reception unit 6 in a modification to the third embodiment of the information display system according to the present invention. Referring to the figure, numeral 61 designates an antenna, and numeral 62 a solar cell. In this example, a coiled antenna is provided on the back surface of the display-unit side transmission/reception unit 6 as the antenna 61 thereof. Information sent from the information sending unit 12 may be received by the antenna 61, whereupon the information may be written into and displayed on the display element 33 by the information writing unit 5. Of course, the shape of the antenna 61 may be at will.

Electric power is necessary in the foregoing case where the information writing unit 5 writes information into the display element 3 or where the display-unit side transmission/reception unit 6 receives information or the information writing unit 5 transfers setting information such as ID. Since, however, no electric power is necessary for keeping displayed information, required power in little. Therefore, this example can be satisfactorily operated without being connected to a commercial power supply, merely by disposing the solar cell 62 and mounting some battery.

Figure 8:
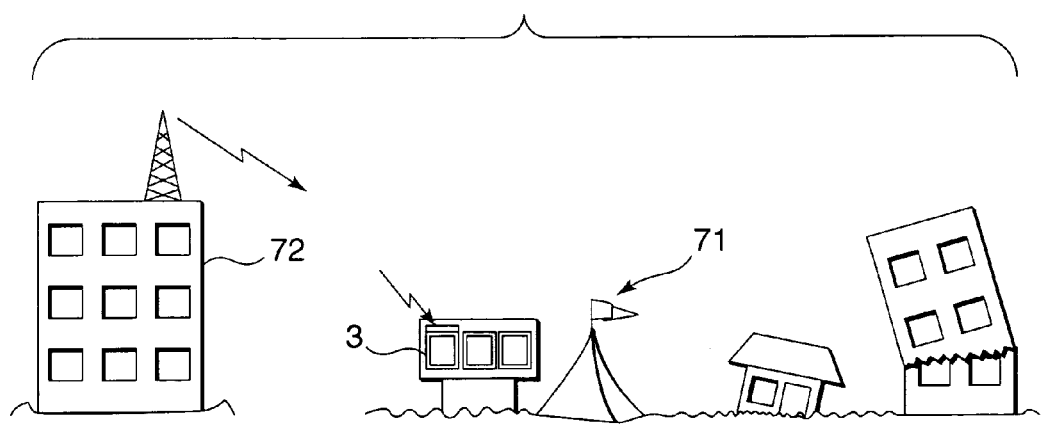
FIG. 8 is a sketch showing an example of an information display system in the case of a disaster.

An example of application of such an information display system in an information display system in the case of a disaster. FIG. 8 is a sketch showing an example of the information display system in the case of a disaster. Ref erring to the figure, numeral 71 designates a refugee camp, and numeral 72 a base station. On the occasion of the disaster, lifelines are cut, and even a commercial power supply, for example, is sometimes unavailable. Besides, on the occasion of the disaster, information is disorderly, and accurate information needs to be reported to disaster victims in real time. In such a situation, the device of, for example, the configuration shown in FIG. 7 is installed in each of the refugee camps 71 established in the disaster-stricken area. Alternatively, the device is installed beforehand in order to prevent disasters. Then, when the accurate information is sent by a wireless system or the like from the information sending unit 12 disposed in the base station 72 located in a distant place, it can be displayed on the display unit 3 disposed in each site. As explained before, the display unit. 3 requires electric power only in the write operation, and the electric power can be fed by the solar cell 62 etc. with, for example, the configuration shown in FIG. 7. Therefore, the necessary information can be displayed in real time even in the district of service interruption, and the accurate information can be offered to the disaster-stricken area.

Further, in the case where the display elements 3 are free to be attached and detached, information can be divided to be displayed on the plural display elements 3 by changing-over the display elements 3, so as to present the displays of these plural display elements 3. Since the display elements 3 have the storability, the displayed information is kept as it is. Thus, many items of information can be offered over a long time.

Figure 9:
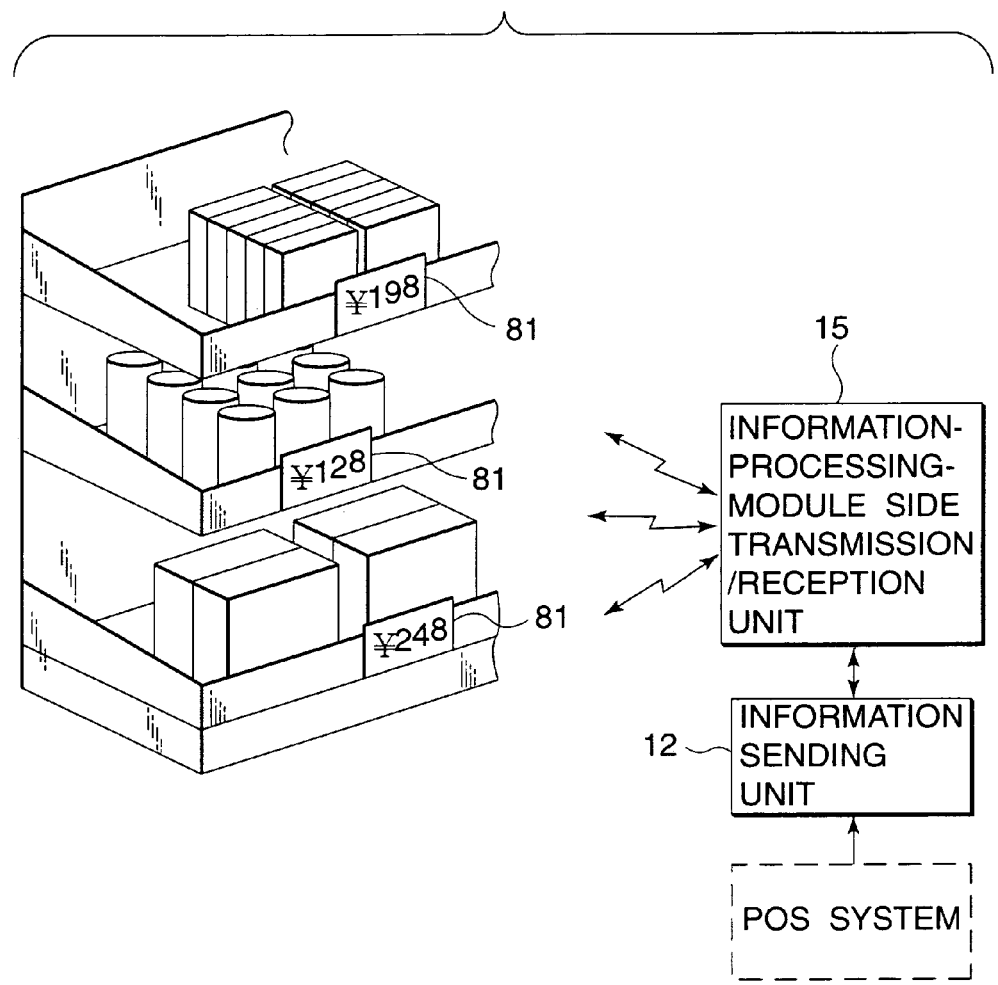
FIG. 9 is a schematic view of an example of a showcase.

Considered as another example of application is a system in which price tags used in a supermarket etc. are replaced with the display elements 3. FIG. 9 is a schematic view of an example of a showcase. Referring to the figure, numeral 81 designates a price tag. The price tag 81 indicates the price of a commodity, and it can be formed of the display element 3. In, for example, the configuration shown in FIG. 5 or FIG. 6, point-of-sale (POS) information items for identifying commodities are held as the setting information held in the information writing units 5. When the price of the commodity is to be registered or altered, the POS information and the price are sent from the information sending unit 12 in interlocking with a POS system. The information writing unit 5 of the display element 3 to form the particular price tag 81 discriminates the sent POS information corresponding thereto, and writes the information of the price into the display element 3. Thus, the price is displayed on the price tag 81. Also in a case where a price changes on account of, for example, a time service, the price to be displayed on the display element 3 can be similarly altered by altering the price in the POS system. Since the displayed price in interlocked with the POS system, the confusion of prices can be prevented in case of, for example, auditing the accounts.

Besides, the display element 3 dissipates electric power only when the displayed price is to be altered. Therefore, the quantity of heat generation is slight, and the price tag 81 can be appended even in a case, for example, where the commodity needs to be kept refrigerated or frozen.

By the way, in this example of the price tags, the wireless system, the infrared system or the like may be employed as shown in FIG. 6. Besides, the configuration shown in FIG. 5 or the configuration shown in FIG. 1 can be employed by, for example, laying fine electric wire pieces on the showcase.

While the two examples of applications have been mentioned here, it is needless to say that the information display system of the present invention is further applicable to extensive uses.

An understood from the above description, the present invention brings forth the effect that information can be displayed instantaneously on multiple display sections. Besides, the display section keeps the display without a power supply, and it is of mall size and light weight considering a displaying extent. Therefore, it is excellent in portability and easiness in handling, and the displayed information can be referred to anytime and anywhere. By way of example, multiple display sections can be widely distributed in the state where the information is displayed on each display section, likewise to paper being a recording medium. Other effects are that, since the display section does not require electric power after the writing of the information thereto, it is excellent in energy savings, and that, since the display section is capable of rewriting information repeatedly, it disrupts environment less as compared with the paper.

Further, by way of example, the information, display system of the present invention can be caused to function as a copying device capable of taking a large quantity of copies instantaneously, by additionally, disposing an information reading section, and the system can be caused to function equivalently to a recording device capable of producing a large quantity of outputs instantaneously, when constructed so as to display external information. Moreover, the system can be applied to vide uses, such as applications to a display system in the case of a disaster and a display system for price tags as is interlocked with a POS system.

What is claimed is:

1. An information display system comprising:
   an information sending unit that provides displayable information and generates selection information to produce setting information;
   plural display devices that display an image based on the displayable information, each display device of the plural display devices corresponding to the setting information that determines whether the display device displays the image; and
   a connector that delivers electric power to the plural display devices and that sends the displayable information from the information sending unit to the plural display devices, wherein the plural display devices continue without electric power to display the image after being disconnected from the connector, the each display device being one of a ferroelectric liquid-crystal display device, a cholesteric liquid-crystal display device and an electrophoretic display device, wherein the plural display devices are detachably attached to the connector, and exchange information with the information sending unit by a wireless system, and the information sending unit is within the connector.

2. An information display system according to claim 1, wherein the information displayed on the display devices is kept even in a state where the display devices are detached from the connector.

3. An information display system according to claim 1, wherein the information sending unit detects the setting information possessed by the display devices and sends the selection information along with the information to-be-displayed on the basis of the setting information, thereby to display the information on selected ones of the display devices.

4. An information display system according to claim 1, wherein the setting information contains information on a size of the display devices.

5. An information display system according to claim 1, further comprising:
   image pickup means for reading an image, wherein the information sending unit sends the image read by the image pickup means, as the information which is to be displayed on the display devices.

6. An information display system according to claim 1, wherein the information sending unit turns externally received information into an image and sends the image as the information which is to be displayed on the display devices.

7. An information display system according to claim 1, wherein the setting information includes an identification number unique for each particular display device.

8. An information display system comprising:
   an information sending unit that provides displayable information and generates selection information to produce setting information;
   plural display devices that display an image based on the displayable information each display device of the plural display devices corresponding to the setting information that determines whether the display device displays the image;
   plural information writing means that writes the displayable information to the plural display devices; and
   a connector that delivers electric power to the plural display devices and that sends the displayable information, to the plural information writing means, wherein the the plural display devices continue without electric power to display the image after being disconnected from the connector, the each display device being one of a ferroelectric liquid-crystal display device, a cholesteric liquid-crystal display device and an electrophoretic display device, wherein the plural display devices are detachably attached to the connector, and exchange information with the information sending unit by a wireless system, and the information sending unit is within the connector.

9. An information display system according to claim 8, wherein the display devices are detachably attached to the information writing means, and the displayed information is kept even in a state where the display devices are detached from the information writing means and the connector.

10. An information display system according to claim 8, wherein the information sending unit adds selection information, for selecting the information in the information writing means, to the information to-be-displayed and sends them together.

11. An information display system according to claim 8, wherein the information writing means has a function of selecting the information sent from the information sending unit, and the information sending unit adds selection information for selecting the information in the information writing means, to the information to-be-displayed and sends them together.

12. An information display system according to claim 11, wherein the information writing means holds setting information therein, and the information sending unit has a function of collecting the setting information from the plural information writing means and adds the selection information to the information to-be-displayed on the basis of the collected setting information.

13. An information display system according to claim 12, wherein the information writing means contains information on presence or absence of the display device, as the setting information.

14. An information display system according to claim 8, wherein the information sending unit and the information writing means exchange information by a wireless system.

* * * * *